United States Patent [19]
Dobran

[11] Patent Number: 4,645,959
[45] Date of Patent: Feb. 24, 1987

[54] LITHIUM-SULFUR HEXAFLUORIDE MAGNETOHYDRODYNAMIC POWER SYSTEM

[76] Inventor: Flavio Dobran, 21st & Broadway, Long Island City, N.Y. 11106

[21] Appl. No.: 741,548

[22] Filed: Aug. 14, 1985

[51] Int. Cl.$^4$ .............................................. H02N 4/02
[52] U.S. Cl. .................................................. 310/11
[58] Field of Search ......................................... 310/11

[56] References Cited

U.S. PATENT DOCUMENTS

| | | | |
|---|---|---|---|
| 3,379,903 | 4/1968 | Rosner | 310/11 |
| 4,107,557 | 8/1978 | Shepherd | 310/11 |
| 4,523,113 | 6/1985 | Kallman | 310/11 |

*Primary Examiner*—Donovan F. Duggan

[57] ABSTRACT

The liquid lithium may be used in a magnetohydrodynamic generator to produce the electrical power. The lithium expansion in the generator is accomplished by a gas whose expansion process is kept nearly isothermal from the high rate of heat transfer from lithium to the gas. The near-constant temperature of lithium in the generator is produced by a chemical reaction with the oxidizer gas sulfur hexafluoride which is also used to expand lithium at a high velocity. Since the oxidizer gas is depleted as it reacts with the fuel lithium, another gas such as helium is introduced at the generator inlet to accelerate the liquid metal across the magnetic field which is applied perpendicularly to the main flow direction. The liquid metal lithium combustion with the sulfur hexafluoride yields a high rate of energy release and the products of combustion are liquids above 1065 degrees Kelvin. By operating the system below the consulate point temperature of 1638 degrees Kelvin, the combustion products can be easily separated and lithium recirculated by an electromagnetic pump or a nozzle-diffuser combination. The neutral gas helium can be also easily separated and may or may not be recirculated through the system. The proposed power system is estimated to yield a power density in excess of 30 MWe/m$^3$ at an operating temperature of about 1200 degrees Kelvin and with an applied magnetic field strength of a few Tesla.

7 Claims, 1 Drawing Figure

LITHIUM-SULFUR HEXAFLUORIDE MAGNETOHYDRODYNAMIC POWER CYCLE

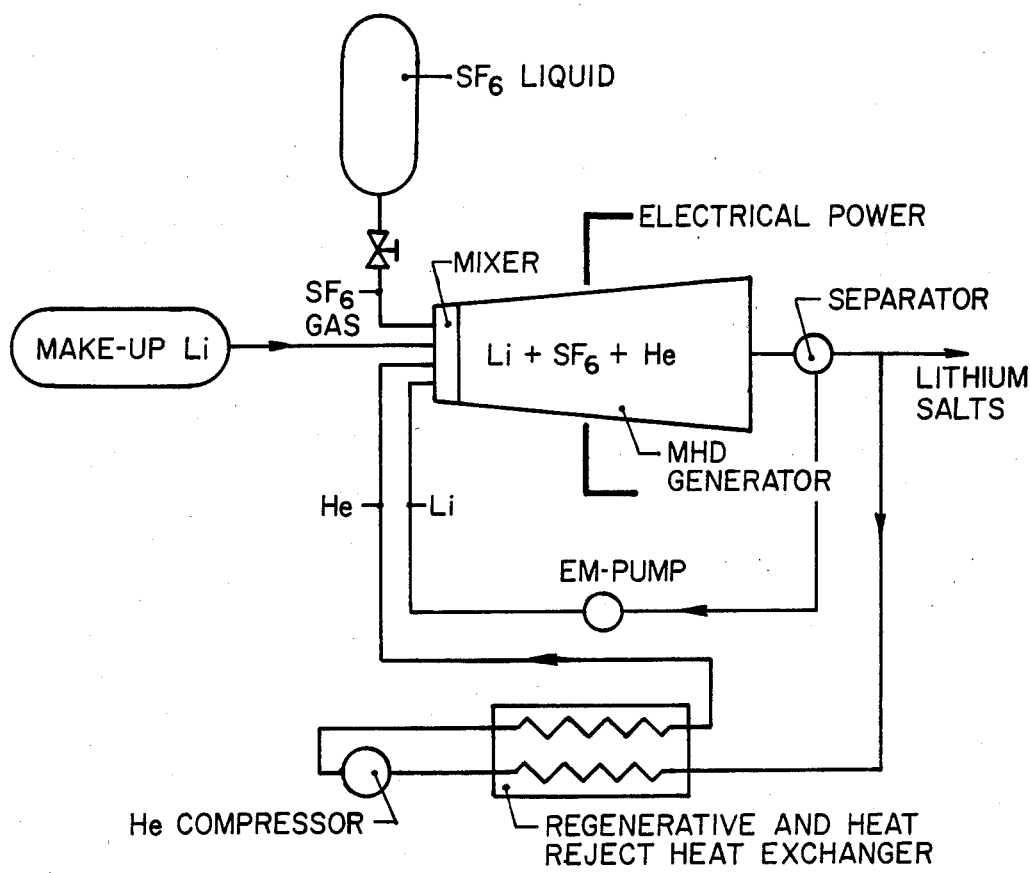
FIG. 1. LITHIUM-SULFUR HEXAFLUORIDE MAGNETOHYDRODYNAMIC POWER CYCLE

LITHIUM-SULFUR HEXAFLUORIDE MAGNETOHYDRODYNAMIC POWER SYSTEM

BRIEF DESCRIPTION

The liquid metal lithium flow in a magnetohydrodynamic generator may be used to generate the electrical power by allowing it to react with the oxidizer gas sulfur-hexafluoride. The expansion of lithium in the generator is accomplished by the oxidizer gas and by an inert gas such as helium. The purpose of the chemical reaction is to provide an isothermal expansion process, while the gas serves the purpose of expanding the liquid metal in the generator. The system should be operated above 1065 degrees Kelvin and below 1638 degrees Kelvin, since in this temperature range the products of combustion are liquids which can be easily separated from lithium at the generator outlet. The combustion of lithium and sulfur-hexafluoride may be also accomplished on the outside of the generator and then mixed with an inert gas to provide the lithium expansion through the generator. The lithium-sulfur hexafluoride combustion proces yields higher energy densities than the conventional fuel-oxidizer combination and the system operation at high temperature produces high cycle efficiency.

DETAILED DESCRIPTION

The system which is illustrated in FIG. 1 can be used to produce the electrical power. The working fluid is the liquid metal lithium which is caused to expand in a magnetohydrodynamic (MHD) generator producing directly the electrical power. In the MHD generator a magnetic field of a few Tesla is applied perpendicularly to the main flow direction producing an induced electrical voltage and current flow between the electrodes. The expansion of lithium in the generator is accomplished by the gaseous sulfur-hexafluoride ($SF_6$) and helium (or by some other neutral gas) which are injected at the generator inlet in such a way to produce a near homogeneous flow during the expansion process. The contact between lithium (Li), a fuel, and $SF_6$, an oxidizer, produces the chemical reaction

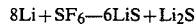

$$8Li + SF_6 \rightarrow 6LiS + Li_2S$$

which yields lithium fluoride and lithium suflide in the reaction products and the liberation of heat energy in the amount of 3.6 KWh/Kg of fuel (lithium) at a temperature between 1065 degrees Kelvin and 1638 degrees Kelvin. When the two-phase flow mixture of Li, $SF_6$ and helium are introduced into the generator, the gas expands and the oxidizer $SF_6$ is gradually depleted by the reaction with lithium. The two-phase multicomponent mixture exiting from the MHD generator is easily separated in a separator (rotating separator, for example) into gas and liquid streams, since the density of the liquid reaction products is about 3.3 times higher than lithium at 1200 K. The liquid lithium is subsequently pumped by an electromagnetic pump or through a nozzle-diffuser combination into the generator inlet where it is also mixed with the helium and $SF_6$ gases and make-up Li from the supply tank. The energy liberated in the combustion process is used to heat the gas to provide an almost isothermal expansion which in turn is used to transfer its kinetic energy to the liquid metal. In the closed cycle depicted in FIG. 1, helium is cooled in a reject and regenerative heat exchanger and compressed to the generator inlet pressure by a compressor.

The lithium has a melting temperature of 452 K. and a density of 534 Kg/$m^3$, whereas $SF_6$ is a nontoxic liquid at room temperature with a vapor pressure of 2.2 MPa at this temperature. As a result, the lithium liquid can be easily stored, and sulfur-hexafluoride gas may be taped directly from a vessel containing liquid $SF_6$. The products of combustion are liquids with the melting point of 1065 K. and they can be easily separated. Since no gaseous products are created during the combustion between Li and $SF_6$, the system is very well suited for operation underwater, on land and in space. Its direct electrical power output can be readily utilized. The energy released of 3.6 KWh/Kg of fuel is 50% larger than for the combustion of oil with oxygen.

The two-phase flow power system depicted in FIG. 1 can be operated in different ways. For example, the helium gas does not have to be recirculated (eliminating, therefore, the helium compressor and heat exchanger) and another suitable gas such as argon can be used. In this case, however, large quantities of the gas will be required. Furthermore, the combustion between Li and $SF_6$ may be accomplished in a combustion chamber on the outside of the generator and prior to mixing with helium, but in this situation the $SF_6$ cannot be used to "pump" the liquid metal through the generator and larger quantities of helium will be required to produce the same power output.

The power system should be operated above the melting point of the combustion products (1065 K.) and below the consulate point (1638 K.) where the density of the reaction products equals the density of lithium and, therefore, presents problems in the separation process. To minimize the piping and generator structural design, the system should be operated close to the atmospheric pressure and with a temperature below the boiling point of lithium at this pressure. The electrical power output should be greater than 30 MWe/$m^3$, and a 100 KWe system might have a generator volume of $10 \times 10 \times 10$ $cm^3$, with 10 cm width to fit between the commercially available electromagnets of the magnetic strength of a few Tesla.

For an efficient lithium expansion in the generator, the gas must be finely dispersed in the continuous liquid metal and the gas volumetric fraction should be about 0.8. Any relative velocity between the gas and liquid is undesirable and it will cause a loss in the system efficiency. The gas bubble size should be a few millimeters and and the gas injection can be accomplished by a distributed system of small nozzles. The materials which are compatible with lithium and $SF_6$ are available.

I claim:

1. A method to operate a two-phase flow magnetohydrodynamic electric power generation system with liquid lithium and gaseous sulfur-hexafluoride flowing through a diverging channel, with side electrodes to remove the electric current generated in the flowing liquid lithium, across the applied magnetic field that is perpendicular to both the flow velocity and electrodes, with sulfur-hexafluoride dispersed in the form of small bubbles and reacting with liquid lithium that forms a continuous phase to conduct the current between the electrodes so as to produce a near isothermal two-phase flow mixture and providing for an expansion of lithium across the magnetic field in the generator.

2. The system of claim 1 should be operated above 1065 and below 1638 degrees Kelvin, whereas the applied magnetic field should be a few Tesla, so that the combustion products lithium fluoride and lithium sulfide can be readily eliminated from the working fluid lithium upon exiting from the magnetohydrodynamic generator and that the generated power densities can be sufficiently high.

3. The system of claim 1 should also use a neutral gas such as helium such that upon its introduction (in the form of small bubbles) at the inlet to the generator it can aid in the expansion of liquid lithium and create, therefore, a higher lithium velocity in the generator and a higher electric power density with a result of also yielding a higher system efficiency.

4. The optimum efficiency of the system of claim 1 will be achieved when the gas is finely dispersed in the liquid metal lithium (gas bubbles of a few millimeters) and the gas volumetric fraction is about 0.8, since then the lithium will be moved with the expanding gas along the generator with minimum slip or maximum velocity of the gas phase.

5. The system of claim 1 can provide an electric power output of 100 KWe in a $10 \times 10 \times 10$ cubic centimeters channel, with a power output that will be greater than 30 MWe/cubic meter.

6. With sulfur-hexafluoride or neutral gas injection at the generator channel inlet in the form of a distributed system of small nozzles, the power system of claim 1 can be designed with optimum efficiency, since the slippage losses between the gas and liquid lithium in the generator will, in this situation, be minimal.

7. The products of combustion of liquid lithium and gaseous sulfur-hexafluoride occuring in the system of claim 1 can be separated from lithium and gas at the exit of the generator by utilizing a centrifugal separation process, since these liquid products are of different densities than the densities of the reaction species; Upon separation, the lithium can be pumped by an elecromagnetic pump and the neutral gas compressed to the inlet pressure of the generator where they are mixed with sulfur-hexafluoride gas so that the cycle can be repeated.

* * * * *